(12) United States Patent
Archer et al.

(10) Patent No.: US 11,655,548 B2
(45) Date of Patent: May 23, 2023

(54) SYSTEM FOR CHEMICAL CONVERSION AND ELECTRICAL ENERGY GENERATION

(71) Applicant: Cornell University, Ithaca, NY (US)

(72) Inventors: Lynden A. Archer, Ithaca, NY (US); Wajdi Issam Al Sadat, Freeville, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 638 days.

(21) Appl. No.: 16/625,270

(22) PCT Filed: Jun. 18, 2018

(86) PCT No.: PCT/US2018/038021
§ 371 (c)(1),
(2) Date: Dec. 20, 2019

(87) PCT Pub. No.: WO2018/236720
PCT Pub. Date: Dec. 27, 2018

(65) Prior Publication Data
US 2020/0216967 A1    Jul. 9, 2020

Related U.S. Application Data

(60) Provisional application No. 62/523,104, filed on Jun. 21, 2017.

(51) Int. Cl.
| | | |
|---|---|---|
| *H01M 4/02* | (2006.01) | |
| *C25B 3/00* | (2021.01) | |
| *H01M 4/38* | (2006.01) | |
| *H01M 4/96* | (2006.01) | |
| *C25B 5/00* | (2006.01) | |
| *H01M 12/08* | (2006.01) | |

(52) U.S. Cl.
CPC .................. *C25B 3/00* (2013.01); *C25B 5/00* (2013.01); *H01M 4/38* (2013.01); *H01M 4/96* (2013.01); *H01M 12/08* (2013.01); *H01M 2300/0022* (2013.01)

(58) Field of Classification Search
CPC ....................................................... H01M 8/04
See application file for complete search history.

(56) References Cited

U.S. PATENT DOCUMENTS

| | | |
|---|---|---|
| 4,407,282 A | 10/1983 | Swartz |
| 4,410,402 A | 10/1983 | Sawyer et al. |
| 4,468,297 A | 8/1984 | Sawyer et al. |
| 4,475,994 A | 10/1984 | Gagne et al. |
| 5,143,710 A | 9/1992 | Sawyer et al. |

(Continued)

OTHER PUBLICATIONS

Sadat et al. ("The O2-assisted Al/CO2 electrochemical cell: A system for CO2 capture/conversion and electric power generation" Science Advances vol. 2, Issue 7, pp. 1-10, Jul. 20, 2016.*

(Continued)

*Primary Examiner* — Jacob B Marks
(74) *Attorney, Agent, or Firm* — Norton Rose Fulbright US LLP (57) ABSTRACT

Systems and methods to upgrade a feedstock include a metal/oxygen electrochemical cell having a positive electrode, a negative electrode and an electrolyte in which the cell is configured to produce superoxide. The superoxide can react or complex with a feedstock to upgrade the feedstock.

35 Claims, 3 Drawing Sheets

(56) References Cited

U.S. PATENT DOCUMENTS

| | | |
|---|---|---|
| 8,999,134 B2 | 4/2015 | Bettelheim et al. |
| 9,517,955 B2 | 12/2016 | Buschmann |
| 9,551,076 B2 | 1/2017 | Buschmann |
| 9,624,589 B2 | 4/2017 | Rosenthal et al. |
| 2014/0242457 A1 | 8/2014 | Archer et al. |
| 2015/0295234 A1 | 10/2015 | Archer et al. |

OTHER PUBLICATIONS

International Search Report and Written Opinion dated Sep. 6, 2018 in International (PCT) Application No. PCT/US2018/038021.

Al Sadat, W. I., et al. "The O2-assisted Al/CO2 electrochemical cell: A system for CO2 capture/conversation and electric power generation" Science Advances, vol. 2, No. 7, Jul. 20, 2016.

Al Sadat, Wajdi Issam. "The Aluminum/Oxygen Electrochemical Cell: A Novel Approach to Chemical Conversion and Energy Storage" Dissertation, Dec. 1, 2017.

Amatore, Christian, et al. "Mechanism and kinetic characteristics of the electrochemical reduction of carbon dioxide in media of low proton availability." Journal of the American Chemical Society, vol. 103, No. 17, pp. 5021-5023, Aug. 1981.

Angamuthu, Raja, et al. "Electrocatalytic CO2 Conversion to Oxalate by a Copper Complex", Science, vol. 327, Issue 5963, pp. 313-315, Jan. 15, 2010.

Hartmann, Pascal, et al. "A comprehensive study on the cell chemistry of the sodium superoxide (NaO2) battery" Physical Chemistry Chemical Physics, vol. 15, No. 28, Apr. 4, 2013.

Iwamoto, Masakazu, et al. "Surface Reactions of Oxygen Ions. 5. Oxidation of Alkanes and Alkenes by O2- on MgO" Journal of Physical Chemistry, vol. 84, No. 23, Nov. 1, 1980.

Lv, Weixin, et al. "Electrochemical Reduction of Carbon Dioxide on Stainless Steel Electrode in Acetonitrile" Advanced Materials Research, vol. 807-809, pp. 1322-1325, 2013.

Membrane Technology, "Researchers convert carbon dioxide into a useful product whilst producing electricity" (Editorial), vol. 2017, Issue 2, pp. 9-10, Feb. 2017.

Nemeth, Karoly, et al. "CO2/oxalate cathodes as safe and efficient alternatives in high energy density metal-air type rechargeable batteries" RSC Advances, vol. 4, Issue 4, pp. 1879-1885, 2014.

Takechi, Kensuke, et al. "A Li-O2/CO2 battery" Chemical Communications, vol. 47, No. 12, Feb. 9, 2011.

Wadhawan, Jay D., et al. "The simultaneous voltammetric determination and detection of oxygen and carbon dioxide A study of the kinetics of the reaction between superoxide and carbon dioxide in non-aqueous media using membrane-free gold disc microelectrodes" Sensors an Actuators B., vol. 88, Issue 1, pp. 40-52, Jan. 1, 2003.

\* cited by examiner

SYSTEM FOR CHEMICAL CONVERSION AND ELECTRICAL ENERGY GENERATION

RELATED APPLICATIONS

The present application is a United States National Phase under 35 U.S.C. § 371 of International Application No. PCT/US2018/038021, entitled "A SYSTEM FOR CHEMICAL CONVERSION AND ELECTRICAL ENERGY GENERATION" and filed on Jun. 18, 2018, which claims priority to, and the benefit of, U.S. Provisional Patent Application No. 62/523,104, and filed on Jun. 21, 2017, the entire disclosures of both of which are hereby incorporated by reference herein.

STATEMENT REGARDING FEDERALLY SPONSORED RESEARCH

This invention was made with government support under Contract No. DMR-1120296 awarded by the National Science Foundation. The Government has certain rights in the invention.

TECHNICAL FIELD

The present disclosure relates to systems and processes for chemical conversion of feedstocks with an electrochemical cell fueled by oxygen.

BACKGROUND

Balancing the increasing world energy demand with the need to economically reduce carbon dioxide emissions is an immediate challenge. Most world energy forecasts show that fossil fuels will continue to play a major role in meeting worldwide energy demands for the foreseeable future, particularly in the transportation and power generation sectors. To capitalize on the exceptional, high energy density of fossil fuels, the incorporation of carbon capture, utilization, and sequestration (CCUS) technologies is essential to reduce global $CO_2$ emissions. Large-scale adoption of classical CCUS technologies (for example, absorption, adsorption, and membrane separation) is currently limited by the additional energy requirements associated with $CO_2$ capture, resulting in higher cost of energy and difficulties in transporting and sequestering the captured $CO_2$. Recently, $CO_2$ capture has been demonstrated for mobile sources, capitalizing on the waste energy of combustion engines.

Conversion of $CO_2$ to useful chemicals and fuels is understood to be a requirement for the commercial success of any CCUS process but has proven to be very difficult because of the thermodynamic and kinetic stability of $CO_2$. Of the catalysts recognized to enable the chemical formation of C—C bonds from $CO_2$, $AlCl_3$ is considered an effective Friedel-Crafts catalyst.

The conversion of $CO_2$ to oxalates (a feedstock to useful chemicals supporting various markets/industries) has been demonstrated electrocatalytically using a copper complex. Also the carboxylation of benzene with $CO_2$, $AlCl_3$, and Al metal has been reported. A similar reaction path has been proposed for the carboxylation of toluene with $CO_2$ and $AlCl_3$.

Metal/$CO_2$ electrochemical cells have been proposed as an approach to capture $CO_2$ from mixed $CO_2/O_2$ gas streams, particularly using metallic Li, Na, and Mg anodes of high-energy densities, while generating electrical energy. A finding from these studies is that the presence of $O_2$ enables chemical reduction and thereby capture of $CO_2$. These metal/$O_2$—$CO_2$ electrochemical capture systems may be operated in either secondary (rechargeable) or primary (non-rechargeable) configurations. In a secondary cell, reduced $CO_2$ species react with oxidized metal ions to form the metal carbonate or bicarbonate and electricity during cell discharge. Recharging the cell would ideally reverse the reaction, consuming electrical energy to release the captured $CO_2$ and $O_2$ and regenerate the metal anode. Adoption of these secondary electrochemical systems in a CCUS process would therefore facilitate separation and concentration of $CO_2$.

However, there is a continuing need for converting low value feedstock chemicals to higher value products.

SUMMARY OF THE DISCLOSURE

An advantage of the present disclosure is a metal/oxygen electrochemical system that can convert low value feedstock chemicals to more valuable products while producing electrical current.

These and other advantages are satisfied, at least in part, by a system to upgrade feedstock comprising a metal/oxygen electrochemical cell comprising a positive electrode, a negative electrode and an electrolyte in which the cell is configured to produce superoxide. Advantageously, the cell is configured to generate sufficient superoxide to react or complex with a feedstock. The system can also include a first conduit in fluid communication with the cell to introduce a feedstock to interact with the superoxide or a reactant of the superoxide thereby upgrading the feed stock; and a second conduit in fluid communication with the cell to recover the upgraded feedstock.

Another aspect of the present disclosure includes a process to upgrade a feedstock comprising supplying a feedstock to a metal/oxygen electrochemical cell while operating the cell to upgrade the feedstock; and recovering the upgraded feedstock. Advantageously, the metal/oxygen electrochemical cell generates electrical current concurrently with upgrading the feedstock.

Embodiments include one or more of the following features individually or combined. For example, in some embodiments, the system includes a battery comprising a plurality of the cells wherein each cell includes a positive electrode configured to contact oxygen; a negative electrode comprising a metal material selected among lithium, sodium, potassium, magnesium, aluminum, titanium, zinc, calcium, copper and iron containing metal materials; and an electrolyte separating the positive electrode and the negative electrode. In other embodiments, the positive electrode comprises a carbon material and/or the electrolyte comprises an ionic liquid with a metal salt. Ionic liquids include imidazolium-based ionic liquids, pyrrolidium based ionic liquids, bis(trifluoromethane sulfonyl)imide based ionic liquids, etc. and metal salts include wherein the metal cation corresponds to the metal anode of the cell, e.g., an aluminum halide salt when the anode comprises aluminum metal.

In still further embodiments, the feedstock comprises carbon dioxide; hydrocarbons, such as liquid hydrocarbons, natural gas, heavy/low-value hydrocarbon distillates; sulfur, hydrogen sulfide or any combination thereof. In certain embodiments, the feedstock can comprise: (i) carbon dioxide, (ii) hydrocarbons, or (iii) carbon dioxide and hydrocarbons to the metal/oxygen electrochemical cell. Other reactive components can be added to the battery along with the feedstock to react with the feedstock. Such reactive components include $H_2$, sulfur, hydrogen sulfide, etc. or any combination thereof. In some embodiments, the feedstock, with or without additional reactive components, is supplied to the system alone or in combination with another reagent, such as carbon dioxide and the system is configured to introduce such feedstocks to the metal/oxygen electrochemical cell. In other embodiments, the system is configured such that feedstock supplied to the electrochemical cell has minimal contact with the electrolyte. The feedstock can be upgraded to oxalates, isomerized hydrocarbons, carboxylated hydrocarbons, and/or oligomerized hydrocarbons. The feedstock and include alkanes and alkenes, with or without reactive components. Such alkenes or alkanes include $C_n$, where n is 1, 2, 3, 4, 5, 6, 8, 9, 10, 11, 12, 13, 14, 15, 16, 17, 18, 19, 20, etc. The products of such feedstock can be isomerized or oligomerized hydrocarbons, with or without oxygenation or carboxylation, such as $C_xH_y$ or $C_xH_yO_z$, where x is n+m and/or (n+m)l, m is 0, 1, 2, 3, 4, 5, 6, 8, 9, 10, 11, 12, 13, 14, 15, 16, 17, 18, 19, 20, etc., and l is 1, 2, 3, 4, 5, etc., and y is any integer that corresponds the number of carbon and other atoms in the compound, and z is 0, 1, 2, 3, 4 or other integer.

In another aspect of the present disclosure, low-value, but thermodynamically stable chemical byproducts such as alkanes or alkanes with $CO_2$ are converted to more valuable feedstocks. These so-called up-conversion processes are expensive because they require energy-intensive and catalytically-driven reactions to drive reaction against thermodynamic gradients. The nucleophilic characteristics of superoxides, generated galvanostatically in a metal/$O_2$ electrochemical cell, can be used in tandem with the catalytic properties of an ionic liquid/metal salt to facilely upgrade hydrocarbon, e.g., alkanes, alkenes, and $CO_2$ feeds. Such a cell can be used to generate the superoxide intermediate also delivers large amounts of electrical energy in the process and as such offers a system for high-energy density storage and chemical up-conversion of low value compounds. Alkanes and alkenes can be oligomerized and isomerized at high conversions, even at room temperature, mimicking the traditionally produced refined products. Incorporating $CO_2$ in the alkane feed leads to formation of carboxylated hydrocarbons such as esters and formates at moderate yields. In certain embodiments, the battery reduces at least a portion of $CO_2$ to $C_2O_4^{2-}$ in an electroreduction reaction to generate oxalates. In some embodiments, the main oxidation product of the upgraded feedstock can have a yield greater than 20%, 30%, 40%, 50%, 60%, 70%, 80%, 90%, or 99%, and encompassing any value therebetween.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

A metal/oxygen (metal/$O_2$) electrochemical system is disclosed that enables chemical conversion of solid, liquid, gas or mixed feedstocks to produce valuable materials. The system also produces electrical power and can be scaled for small or large volume operations.

The chemical conversion process for upgrading feedstocks is enabled by electrochemically generated reactive superoxide species during discharge of a metal/$O_2$ electrochemical cell. The superoxide species is capable of reacting/complexing with a variety of feedstocks to generate higher-value products.

For example, superoxide generation has been demonstrated for decades (chemical and electrochemical) and used to convert different feedstocks. In addition, electrochemically-generated superoxide has been shown, for example, to facilitate the degradation of hazardous halogenated hydrocarbons and mustards, to deprotonate nitroaromatic amines, and to carboxylate amines, amides and alcohols in the presence of $CO_2$. Superoxides have also been used to convert alkanes and alkenes to a variety of products including methane, aldehydes and alcohols either under high temperature or using catalysts. Finally, superoxides have been reported to convert fluorene, diphenylmethane and distyrylmethane to kerosenes. Superoxides are employed in many chemicals processes, including hydrocarbon desulfurization, alcohol and amines carboxylation and hydrocarbon dehydrogenation. As an example, paraffin conversion using chemically produced Ti(IV) superoxide, converts propane at moderate efficiency (12% conversion) mainly to acetone (80% yield), but only in the presence of $H_2O_2$. Chemically produced potassium superoxide has likewise been demonstrated to achieve complete conversion of aromatics to ketones. MgO was used as a catalyst to convert alkanes and alkenes using chemically-produced superoxide, however mainly producing $CO_2$ (45% yield) and fragments of the starting hydrocarbons.

The metal/oxygen (metal/$O_2$) electrochemical system of the present disclosure may generate sufficient superoxide which reacts or complexes with a feedstock that can be introduced to the cell alone or with other reagents to form an upgraded feedstock. Feedstocks can include, for example, carbon dioxide, hydrocarbons such as liquid hydrocarbons, natural gas, heavy/low-value hydrocarbon distillates, sulfur, hydrogen sulfide or a combination thereof. The feedstocks can also be combined with other reagents while interacting with the superoxide such as $CO_2$, which can be used to carboxylate feedstocks or form carbonates thereof.

The metal/oxygen electrochemical system of the present disclosure can be designed in a variety of architectures including metal/oxygen electrochemical cells in the form of coin, cuvette, fed-batch or continuous flow battery configurations. The cell components (anode, cathode, electrolyte, separator, etc.) can be selected from a range of electrically conductive materials to enable operations at a range of thermodynamic (temperature, pressure, composition), electrochemical (current, voltage), and flow conditions, including with assistance from catalysts.

Carbon dioxide assisted metal-oxygen batteries were reported for $CO_2$ capture and conversion into electrical energy. See U.S. 2015-0295234 the entire disclosure of which is hereby incorporated by reference herein. Such carbon dioxide assisted metal-oxygen batteries can be modified under conditions and in systems of the present disclosure to upgrade feedstock and recover the upgraded feedstock.

One aspect of the present disclosure includes a system to upgrade feedstock. The system can comprises a metal/oxygen electrochemical cell including a positive electrode, a negative electrode and an electrolyte in which the cell is configured to produce sufficient superoxide to react or complex with a feedstock, which can be supplied to the system with or without other reagents. The system can be a closed system to operate in a batch mode or the system can be open to operate in a continuous or semi-continuous mode. For example, the system can include a first conduit in fluid communication with the cell to introduce a feedstock to interact with the superoxide thereby upgrading the feed stock; and a second conduit in fluid communication with the cell to recover the upgraded feedstock.

Figure 1:
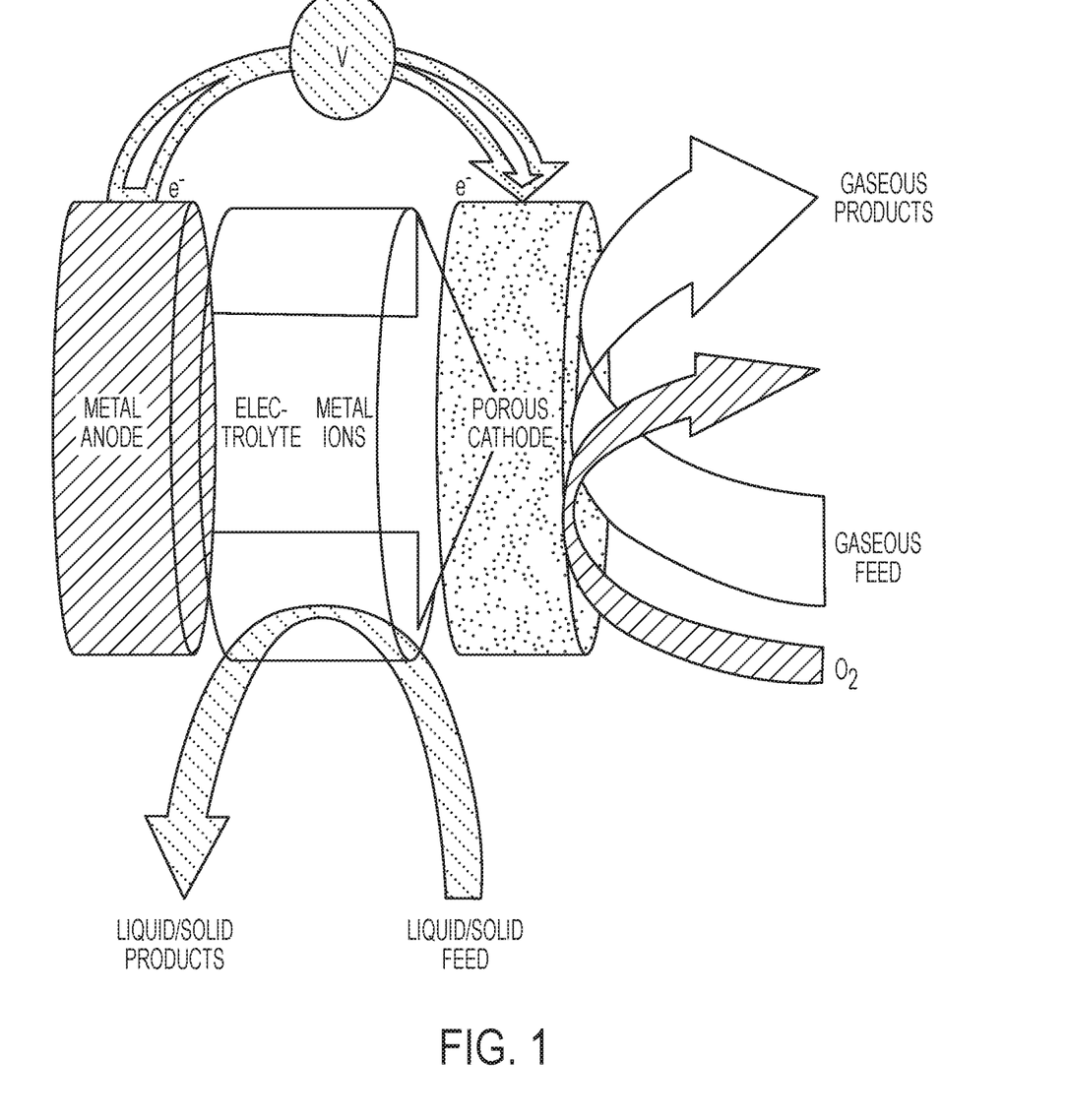
FIG. 1 illustrates a general architecture of a metal/$O_2$ system that can convert low value feedstock chemicals to more valuable products while producing electrical current.

FIG. 1 illustrates a general architecture of a metal/$O_2$ system that can convert low value feedstock chemicals to more valuable products while producing electrical current. The figure shows a metal anode and a porous cathode which are separated with an electrolyte to enable ion transport. As illustrated the system is configured to allow oxygen to diffuse into the electrolyte through the porous cathode, which may be, for example, high surface area porous carbon. Gas, liquid, solid or a mixture of feedstocks can be introduced into the system to upgrade the feedstock by electrochemically generated superoxide species. The system produces electric power through an external circuit with a load to allow transport of electrons from the anode to the cathode. The feedstock can be upgraded to: (i) oxalates; (ii) higher molecular weight hydrocarbons; (iii) lower molecular weight unsaturated hydrocarbons; (iv) isomerized hydrocarbons; (v) oligomerized hydrocarbons; (vi) polymeric hydrocarbons, (vii) carboxylated versions of (ii-vi); and/or chlorine-containing analogs of (ii-vii), for example.

In addition, the system of the present disclosure can include a battery of the cells wherein each cell includes a positive electrode configured to contact an oxygen, e.g., a carbon material; a negative electrode comprising a metal material selected among lithium, sodium, magnesium, aluminum, zinc, calcium, copper and iron containing metal materials; and an electrolyte separating the positive electrode and the negative electrode.

As used herein, a "metal material" as disclosed and claimed herein is in a first instance intended as one of a pure metal and a metal alloy including at least one metal selected from the group consisting of sodium, magnesium, aluminum, zinc, calcium, copper and iron metals. A "metal material" as disclosed and claimed herein is in a second instance also intended to include a metal oxyanion salt including at least one metal selected from the group consisting of sodium, magnesium, aluminum, zinc, calcium, copper and iron metals.

The electrolyte is generally a non-aqueous electrolyte and typically includes a salt. Useful electrolytes include ionic liquids such as imidazolium-based ionic liquids, pyrrolidium based ionic liquids, bis(trifluoromethane sulfonyl)imide based ionic liquids, etc. and metal salts include wherein the metal cation corresponds to the metal anode of the cell, e.g., an aluminum halide salt when the anode comprises aluminum metal.

Another aspect of the present disclosure includes a process to upgrade a feedstock by operating a metal/oxygen electrochemical cell of the present disclosure. Such cells can be operated to produce sufficient superoxide to react with or complex with the feedstock. The process includes supplying a feedstock to a metal/oxygen electrochemical cell while operating the cell to generate electrical current and to upgrade the feedstock. The upgraded feedstock can then be recovered. The feedstock can comprise carbon dioxide, hydrocarbons such as liquid hydrocarbons, natural gas, heavy/low-value hydrocarbon distillates, sulfur, hydrogen sulfide or a combination thereof. In some embodiments, the upgraded feedstock can include species including sulfur, nitrogen, phosphorus, or any combination thereof.

In one implementation of the system of the present disclosure, the anode of the electrochemical cell comprises aluminum metal. A mixture of ionic liquid and aluminum salt can be used as the electrolyte and a porous conductive carbon material can be used as the cathode. When such a cell is discharged under a mixture of $O_2$ and $CO_2$, the $CO_2$ was converted to oxalate under ambient conditions. The oxalate can then be recovered and converted to oxalic acid. Such a system can be used to capture and convert $CO_2$ from exhaust streams of stationary or mobile machines to produce valuable products, while at the same time generating electrical power.

In another example of the versatility of the systems of the present disclosure, an alkane feedstock was supplied to an aluminum/oxygen electrochemical cell by introducing alkanes to the cell. During discharge of the cell under $O_2$, upgraded, longer chain alkanes were produced under ambient conditions. Such embodiment can be used to polymerize/oligomerize hydrocarbons and incorporate different components (e.g. $CO_2$) to hydrocarbons. Also, light hydrocarbons can be produced from heavy hydrocarbons and alkanes can be isomerized.

In practicing certain aspects of the present disclosure, aluminum metal was studied as the anode for the metal/oxygen (metal/$O_2$) electrochemical cell of the system. Aluminum is an attractive anode material for electrochemical capture and conversion of $CO_2$ because of its relatively low cost and lower reactivity, in comparison to Li and Na, which makes electrochemical systems involving Al inherently safer and potentially easier to manufacture. As the third most abundant element in Earth's crust, Al is also available in regions all over the world. The material has a high specific energy (reported electrochemical equivalence of 2980 A·hour/kg), which means that its electrochemical conversion by $CO_2$ may also be used to generate large quantities of electrical energy.

In addition, in Al electrochemical systems, room-temperature ionic liquids present attractive alternative to alkaline and saline (aqueous and non-aqueous) electrolytes, which are associated with parasitic corrosion and hydrogen evolution problems. The ionic liquid/salt melt of 1-ethyl-3-methylimidazolium chloride ([EMIm]Cl)/aluminum chloride ($AlCl_3$) is particularly versatile because of its thermal and electrochemical properties. The electrochemically prevalent species can be designated by adjusting the ratio of $AlCl_3$ to [EMIm]Cl.

Imidazolium-based ionic liquids may capture $CO_2$ by complexing with $CO_2$. This may include the multistep chemisorption of $CO_2$ with the imidazolium cation and associated anion. Ionic liquids may display catalytic activity in the conversion of hydrocarbons, and when mixtures of high-value olefins and $H_2$ gas are used as feedstock, oligomerization and isomerization of the hydrocarbon can occur. For example, in the presence of 1-butyl-3-methylimidazolium chloride/$AlCl_3$ (with higher $AlCl_3$ molar ratio), gaseous olefins ($C_2H_4$, $C_3H_6$, $C_4H_8$) and $H_2$ may be converted to $C_8$-$C_{15}$ iso-paraffins with 80% selectivity. In addition, imidazolium ILs serve as excellent hosts for $AlCl_3$, allowing the pH of the electrolyte to be facilely manipulated using salt or IL solvent concentrations to promote reversible stripping and plating of metallic aluminum under ambient conditions. In some embodiments, the upgraded feedstock may include species having a carbon multiple relative to species of the intake feedstock greater than 2, 3, 4, 5, 6, 7, 8, 9 or 10, and encompassing any value therebetween.

An equimolar mixture will have $AlCl_4$ as the primary anion. Basic melts, where the molar ratio of [EMIm]Cl is higher than that of $AlCl_3$, contain $Cl^-$ and $AlCl4^-$ anions. Acidic melts with higher $AlCl_3$-to-[EMIm]Cl ratio have $AlCl_4$ and $Al_2Cl_7$ as the prevailing ions and are demonstrated to have higher conductivity and lower viscosity. Aluminum batteries based on these electrolytes have recently attracted considerable attention. In aluminum ion batteries, the acidic [EMIm]Cl/$AlCl_3$ melt has been used in conjunction with sulfur, $V_2O_5$, $LiFePO_4$, and carbon-based cathodes. Further, ultrafast rechargeable aluminum ion battery based on the intercalation/deintercalation of $AlCl_4$ in graphitic carbon electrodes was reported. Although the capacity of the battery was limited to about 60 mA hour/$g_{Graphite}$, the columbic efficiency was maintained at 97% at high applied current density.

An exemplary embodiment of the present disclosure includes an Al/$CO_2$—$O_2$ electrochemical cell based on an [EMIm]Cl/$AlCl_3$ electrolyte melt. This cell design is effective for both capturing $CO_2$ and upconverting the captured $CO_2$ to a $C_2$ species, an oxalate, without the need for a catalyst or high-temperature cell operation. Moreover, superoxide produced in an Al/$O_2$ electrochemical cell oligomerizes and isomerizes alkane or alkene feedstock. Discharged in a mixture of $O_2$ and $CO_2$, the system is also shown to produce ester and formate in moderate yields, demonstrating that low-value hydrocarbon feedstocks and $CO_2$ emissions may be converted to higher value products. Al/$O_2$ electrochemical cells based on an acidic [EMIm]Cl/$AlC_3$ melt have been reported to produce approximately 158 mA·hour/$g_{Carbon}$ of electrical energy during cell discharge at around 0.7 V under a current density of 0.2 mA/$g_{Carbon}$. An Al/$O_2$ battery based on 1-ethyl-3-methylimidazolium oligofluoro-hydrogenate [EMIm$(HF)_{2.3}$F] electrolyte producing substantially higher discharge capacity (7450 mA·hour/$g_{Carbon}$) at around 1.0 V under current density of about 79 mA/$g_{Carbon}$. In addition to providing a process for $CO_2$ capture and conversion, an Al/$CO_2$—$O_2$ cell based on [EMIm]Cl/$AlC_3$ can deliver very high discharge capacities (as high as 13,000 mA·hour/$g_{Carbon}$) at a discharge voltage of around 1.4 V when discharged at a fixed rate of 70 mA/$g_{Carbon}$.

Using aluminum as an anode in the electrochemical cell enabled the production of electrical energy when the cell is galvanostatically discharged in an atmosphere of specific gases, which are allowed to diffuse in the electrolyte through the porous, electrically conductive cathode. Under constant current, oxidation of the aluminum anode and reduction of the diffused gases on the cathode produced a potential plateau indicative of the electrochemical reaction taking place. Postmortem analysis of the discharged cells was carried out using different techniques to identify the reaction products and showed congruence in the results.

Direct analysis in real-time mass spectrometry (DART-MS) was used to identify the main reaction products from the ionized fragments. Energy-dispersive x-ray spectroscopy (EDXS) and wide-scan x-ray photoelectron spectroscopy (XPS) were used to compare the atomic ratios of aluminum, oxygen, and carbon, and high-resolution XPS was used to identify the bonds formed by these atoms. Coupled thermogravimetric analysis (TGA)-Fourier transform infrared (FTIR) spectroscopy was used to compare the discharged cathodes with the expected spectra for the primary reaction product as deduced from the EDXS and XPS analyses.

In an exemplary embodiment of the present disclosure, an Al/$O_2$ electrochemical cell may be discharged in a mixture of $AlCl_3$/EMImCl that is advantageous for its thermal and electrochemical stability. The electrochemically prevalent species may be determined by adjusting the ratio of $AlCl_3$ to EMImCl. An equimolar mixture will have $AlCl_4^-$ as the primary anion. Basic melts, where the EMImCl molar ratio is higher than $AlCl_3$, include $Cl^-$ and $AlCl_4^-$ as the anions. Acidic melts, with higher $AlCl_3$ to EMImCl ratio have $AlCl_4^-$ and $Al_2Cl_7^-$ as the predominant anions. The acidic 2:1 ($AlCl_3$:EMImCl, molar ratio) electrolyte may facilitate utilization of the electrochemically generated superoxide for conversion of a range of feedstocks.

A hydrocarbon, such as decane, may be used as a feedstock. In the Al/$O_2$ electrochemical system, Al acts as the anode and $O_2$ diffuses through the porous carbon cathode into the electrolyte. The electrochemical reduction process takes place on the surface of the cathode, where superoxide ($O_2^-$) specie is generated. The Al anode is oxidized releasing an electrical current through an external circuit where electric energy can be harnessed.

Mixing the hydrocarbon, such as n-decane, with a 2:1 ($AlCl_3$:EMImCl) electrolyte results in the formation of two heterogenous fluid layers. Discharging the mixture under pure $O_2$, causes the two layers to merge to form a single homogenous fluid layer. During this process, the electrochemical cell generates 1,645 mAh/$g_{carbon}$ capacity at 0.7V potential. The discharge potential is lower than that achieved by discharging the cell without hydrocarbons (1.4V), but the discharge capacity is almost four-times higher. The difference in discharge potential can be attributed to the additional resistance of $O_2$ diffusion through the hydrocarbon layer and transport barriers imposed by the hydrocarbon layer to ion migration to the cathode. The alkane is therefore thought to act as a sacrificial material, reacting/complexing with the superoxide generated by reduction of $O_2$ at the cathode and lowering the production of the passivating aluminum oxide on the porous cathode, which explains the increase in capacity. The electrochemical reactions involve the oxidation of Al anode and reduction of $O_2$ on the surface of carbon cathode.

Gas Chromatography-Mass Spectrometry (GC-MS) of the homogenous electrolyte/hydrocarbon layer showed the conversion of n-decane ($C_{10}H_{22}$) to a distribution of longer alkanes (up to heptacosane, $C_{27}H_{56}$), as shown in Table 1.

TABLE 1

| Composition | Yield (%) |
| --- | --- |
| $C_{15}H_{32}$ | 17.43 |
| $C_{21}H_{44}$ | 11.79 |

TABLE 1-continued

| Composition | Yield (%) |
|---|---|
| $C_{27}H_{56}$ | 7.13 |
| $C_{18}H_{38}$ | 6.88 |
| $C_{24}H_{50}$ | 6.47 |
| $C_{12}H_{26}$ | 6.23 |
| $C_{26}H_{54}$ | 5.41 |
| $C_{25}H_{52}$ | 4.12 |
| $C_{23}H_{48}$ | 4.05 |
| $C_{14}H_{30}$ | 4.04 |

Hydrocarbons of the same composition were detected at different retention times due to isomerization (branching and cyclization) taking place dynamically during discharge, as the hydrocarbons interact with the superoxide and electrolyte species. Typically, boiling point of alkanes with similar composition increases as they go from highly branched, to straight chains to cyclic. In the liquid phase, 97.10% conversion of n-decane was achieved with the highest yield for pentadecane (17.48%), based on GC-MS. Unsaturated hydrocarbons were also detected in small yields (all unsaturated species less than 5%).

Mass spectrometry of the electrochemical cell's headspace, using Residual Gas Analysis (RGA), revealed that the solution phase process also generated smaller alkanes and $CO_2$ as side products, as shown in Table 2.

TABLE 2

| Composition | Yield (%) |
|---|---|
| $C_4H_{10}$ | 0.52 |
| $C_3H_8$ | 0.20 |
| $C_2H_6$ | 1.89 |
| $CH_4$ | 0.67 |
| $CO_2$ | 0.13 |

Discharging the electrochemical cell converted 3.41% of n-decane to gaseous alkanes ($C_4$ to $C_1$) and $CO_2$. The m/z signal associated with $O_2$ (32 and 16) is also seen to decrease, indicating the consumption of $O_2$ during discharge. The $CO_2$ yield is low and amount to at most 0.13%. This demonstrates the ability of $Al/O_2$ cell to fractionate hydrocarbons, potentially producing light hydrocarbons from heavier, low value feedstocks, with minimal $CO_2$ emissions. The $Al/O_2$ electrochemical cell can also up-convert/upgrade alkanes under mild conditions. Previous investigations showed $CO_2$ as the main oxidation product (yield of 45%) when chemically-generated superoxides are used to chemically convert alkanes. In some embodiments, the main oxidation product of the upgraded feedstock may have a yield greater than 20%, 30%, 40%, 50%, 60%, 70%, 80%, 90%, or 99%, and encompassing any value therebetween.

On the other hand, without electrochemical discharge, mixing n-decane and the 2:1 ($AlCl_3$:EMImCl) electrolyte and exposing the mixture to $O_2$, results in two layers (top-hydrocarbon and bottom-electrolyte). GC-MS of the top hydrocarbon layer shows the dominance of n-decane with a distribution of isomers that arise from interactions between the alkane and electrolyte. Hydrocarbons were also detected in the electrolyte layer but with n-decane accounting for only 8.39% of the GC-MS spectra, the remaining detected hydrocarbons were mainly unsaturated. The salt used in the electrochemical cell ($AlCl_3$) has been demonstrated to isomerize alkanes. The conversion is typically low (<30%) and the selectivity depends on promoters.

Results from Proton Nuclear Magnetic Resonance Spectroscopy ($^1$H-NMR) further confirm the high degree of isomerization due to alkane-electrolyte interactions. Hydrocarbons isolated from the electrolyte (either only mixed or mixed/discharged) show the presence of alkenes. Aromatic protons were only detected when the alkane/electrolyte mixture is discharged in an $Al/O_2$ cell. Al-NMR confirms the rise of an aluminum chloride/hydrocarbon complex when the electrolyte is mixed with n-decane and the conversion of such complex during discharge. These results demonstrate that the electrochemically generated superoxide is involved in the conversion reaction.

Oligomerization and isomerization of the starting n-decane in an Al/2:1($AlCl_3$:EMImCl)/$O_2$ cell was also confirmed using Direct Analysis in Real Time (DART) Mass Spectrometry (MS). Unsaturation was, particularly, highlighted by DART-MS in hydrocarbons isolated from the bottom electrolyte layer when mixed with n-decane due to protonium/deuterium (H/D) exchange with the deuterated solvents ($CDCl_3/D_2O$).

Oligomerization and Isomerization of Alkene (1-Decene) Feed

To evaluate the effect of superoxide on unsaturated hydrocarbons, the $Al/O_2$ was discharged with an alkene feed. In contrast to the alkane/2:1($AlCl_3$:EMImCl) electrolyte mixture, the alkene-electrolyte mixture forms a single homogenous layer. Without discharge, 1-decene disappears giving rise to saturated hydrocarbons with the main signal for n-decane. Discharging 1-decene in the $Al/O_2$ cell also converted the 1-decene to saturated hydrocarbons. Distinctly, however, the main product is associated with pentadecane (36.95% yield). The alkene was completely converted to saturated hydrocarbons due to interaction with the electrolyte. Dominance of up-converted species was driven by the electrochemically generated superoxide. $^1$H-NMR confirms the disappearance of the alkene, when in contact with the 2:1($AlCl_3$:EMImCl) electrolyte.

Comparing the discharge of the $Al/O_2$ cell under the alkane and alkene, the unsaturation is in a specific location along the chain (1-decene). The electrochemically generated superoxide reacting with the alkene in a specific location produced the primary product (pentadecane). On the other hand, the electrolyte complexes with alkane (n-decane) to produce unsaturation in different locations (detected in the electrolyte layer) which react with the superoxide to produce a much wider distribution of products.

Active Catalytical Species in the Electrolyte

The electrolyte may facilitate conversion of the hydrocarbon feedstock using the electrochemically generated superoxide. The composition of $AlCl_3$ and EMImCl in the electrolyte may be manipulated to change the active anions present. In electrolytes with a large excess of EMImCl, the material forms a basic melt with $AlCl_4^-$ and $Cl^-$ as the predominant anions. Notably, discharging this basic electrolyte with n-decane produced no change in the starting material. The two n-decane and electrolyte layers remained separate even after discharge. Only n-decane was detected in both top alkane and bottom 1:2.3($AlCl_3$:EMImCl) electrolyte layers with no evidence of isomerization, upgrade or branching. Remarkably, the introduction of an alkene to this electrolyte yielded a phase separated material with no evidence of interactions with the underlying melt. While the acidic electrolyte (2:1 $AlCl_3$:EMImCl) converted 1-decene to decane, the basic electrolyte has no effect as there is no evidence of conversion, isomerization or branching of the alkene.

Chemically Generated Superoxide

Metal superoxide was generated chemically by reacting $KO_2$ and Dicyclohexo-18-Crown-6 in n-decane and 1-decene. In the absence of the $EMImCl$-$AlCl_3$ electrolyte, the chemically produced superoxide has no noticeable effect on n-decane. However, it converts 1-decene to longer chains, up to hexadecane, but with much lower conversion (3.9%). The low alkene conversion is attributed to the short lifetime of superoxide in hydrocarbons compared to ionic liquid-based electrolyte. Both results have been confirmed by $^1$H-NMR.

Carboxylation of Hydrocarbons (The $Al/O_2$+$CO_2$ Electrochemical Cell)

Carbon dioxide may be added to $O_2$ gas phase. It is found that $CO_2$ causes carboxylation of liquid hydrocarbons under specific circumstances. In particular, maintaining the same architecture of the electrochemical cell and discharging Al/80% $CO_2$ (denoting 80% $CO_2$ and 20% $O_2$) with n-decane or 1-decene resulted in identical products to discharging the hydrocarbons in an $Al/O_2$ cell, as confirmed by GC-MS. The superoxide reacts with the hydrocarbons and show little activity towards $CO_2$. This could be understood in terms of the thermodynamic stability of $CO_2$ and competing interaction of the hydrocarbons with the electrolyte. To improve the $CO_2$-electrolyte interaction and superoxide's chance to react with $CO_2$, the electrochemical cell may be modified to reduce the exposure of the hydrocarbons to the electrolyte. The hydrocarbons may be introduced to the electrochemical cells through a capillary, limiting exposure of the bulk electrolyte. Discharging the Al/2:1($AlCl_3$:EMImCl)/80% $CO_2$ cell under such conditions wherein limited contact to n-decane was maintained may produce products of dramatically different chemistry, as shown in Table 3.

TABLE 3

| Composition | Yield (%) |
|---|---|
| $C_{14}H_{22}$ | 8.34 |
| $C_{14}H_{22}O$ | 7.06 |
| $C_6H_{13}O_4$ | 6.49 |
| $C_{12}H_{21}O_2$ | 6.31 |
| $C_{14}H_{24}$ | 6.09 |
| $C_8H_{18}$ | 6.04 |
| $C_{11}H_{20}O_2$ | 5.10 |
| $C_{10}H_{22}$ | 4.85 |
| $C_{15}H_{24}O_2$ | 4.70 |
| $C_{17}H_{32}$ | 4.17 |
| $C_{11}H_{12}$ | 3.63 |
| $C_{12}H_{10}$ | 3.15 |
| $C_{10}H_{14}O$ | 3.03 |
| $C_{18}H_{32}$ | 2.73 |
| $C_{10}H_{20}$ | 2.47 |
| $C_{13}H_{20}O$ | 2.40 |
| $C_8H_{14}O_4$ | 2.38 |
| $C_{10}H_{11}O_2$ | 1.39 |
| $C_{13}H_{18}O_2$ | 1.15 |
| $C_2H_{12}O_2$ | 0.72 |

The conversion of n-decane was 77.35%, producing hydrocarbons as high as $C_{18}$. Remarkably, 21.27% of the products contained added $CO_2$ groups. The $^1$H-NMR spectra corroborate the GC-MS results showing the detection of protons associated with formates and esters.

Discharging the Al/2:1($AlCl_3$:EMImCl)/80% $CO_2$ cell with limited contact of 1-decene changed the results, as shown in Table 4.

TABLE 4

| Composition | Yield (%) |
|---|---|
| $C_{30}H_{52}$ | 43.97 |
| $C_{30}H_{50}O$ | 17.23 |
| $C_{27}H_{46}O_2$ | 12.54 |
| $C_{28}H_{38}O_2$ | 10.48 |
| $C_{27}H_{46}O_3$ | 8.75 |
| $C_{29}H_{50}O$ | 1.37 |
| $C_{29}H_{48}O$ | 1.12 |
| $C_{30}H_{54}$ | 0.82 |

The alkene was converted completely, producing compounds as large as $C_{30}$. Of the produced hydrocarbons, 21.30% of the yield contained added $CO_2$ groups. When starting with an alkene, GC-MS and $^1$H-NMR results show the incorporation of $CO_2$ as esters. DART-MS demonstrate similar trends. In some embodiments, the conversion of a feedstock, for example n-decane or decene, is greater than about 20%, 30%, 40%, 50%, 60%, 70%, 80%, 90%, and 99%, and encompassing any value therebetween. In addition, other alkenes or alkanes can be supplied to the metal/oxygen electrochemical cell while operating the cell to generate current and to upgrade the feedstock. Such alkenes or alkanes include $C_n$, where n is 1, 2, 3, 4, 5, 6, 8, 9, 10, 11, 12, 13, 14, 15, 16, 17, 18, 19, 20, etc. The products of such feedstock can be isomerized or oligomerized hydrocarbons, with or without oxygenation or carboxylation, such as $C_xH_y$ or $C_xH_yO_z$, where x is n+m and/or (n+m)l, m is 0, 1, 2, 3, 4, 5, 6, 8, 9, 10, 11, 12, 13, 14, 15, 16, 17, 18, 19, 20, etc., and l is 1, 2, 3, 4, 5, etc., and y is any integer that corresponds the number of carbon and other atoms in the compound, and z is 0, 1, 2, 3, 4 or other integer.

Hence, discharging the cell in the presence of $CO_2$ and hydrocarbons produces a competition for reaction with electrochemically generated superoxide. Both materials may be thought to act as sacrificial agents and protect other components in the cell from the superoxide. Limiting the exposure of the hydrocarbons to the electrolyte allows $CO_2$ to complex with the acidic electrolyte and interact with the electrochemically generated superoxide, which favors its incorporation into hydrocarbon structures generated in the cell.

Conversion of thermodynamically stable chemicals (e.g., alkanes, $CO_2$) is typically energy intensive and catalytically driven. To produce suitable fuels, hydrocarbons are upgraded through alkylation, isomerization, aromatization, blending and other processes. Highly branched, cyclic and aromatics isomers have higher octane rating and are blended with paraffins to upgrade the value of fuels. Carboxylation of hydrocarbons allows the capture of $CO_2$ and conversion to feedstocks of value to many industries/markets. In addition, carboxylated hydrocarbons, particularly esters and formates, have been proposed as fuel additives, increasing the octane rating of the fuel.

An $Al/O_2$ electrochemical system may be used to convert low-value feedstocks, utilizing the reactive superoxide and catalytic ability of the electrolyte. The system runs galvanostatically, producing considerable amount of energy. The $Al_2Cl_7^-$ anion in the imidazolium-based/$AlCl_3$ electrolyte enables the activation of the hydrocarbons. With discharge, the generated superoxide allows for the oligomerization/isomerization of alkanes or alkenes with high conversion, increasing the value of the starting hydrocarbons. Discharging the electrochemical system under $O_2$ and $CO_2$, allows the conversion of $CO_2$ and hydrocarbons to esters and formates.

The produced mixture of upgraded components may replace traditional fuel blends, eliminating the need for the separation of individual components. Separation of the produced hydrocarbon mixture, on the other hand, can be achieved by designing a process where the oligomerized, isomerized and carboxylated species build up in the paraffin layer since it does not mix with the imidazolium-based ionic liquid electrolyte. Alternatively, the hydrocarbon products can be separated thermally, relying on the negligible vapor pressure of imidazolium chloroaluminate electrolyte.

Electrochemical Method

Figure 2:
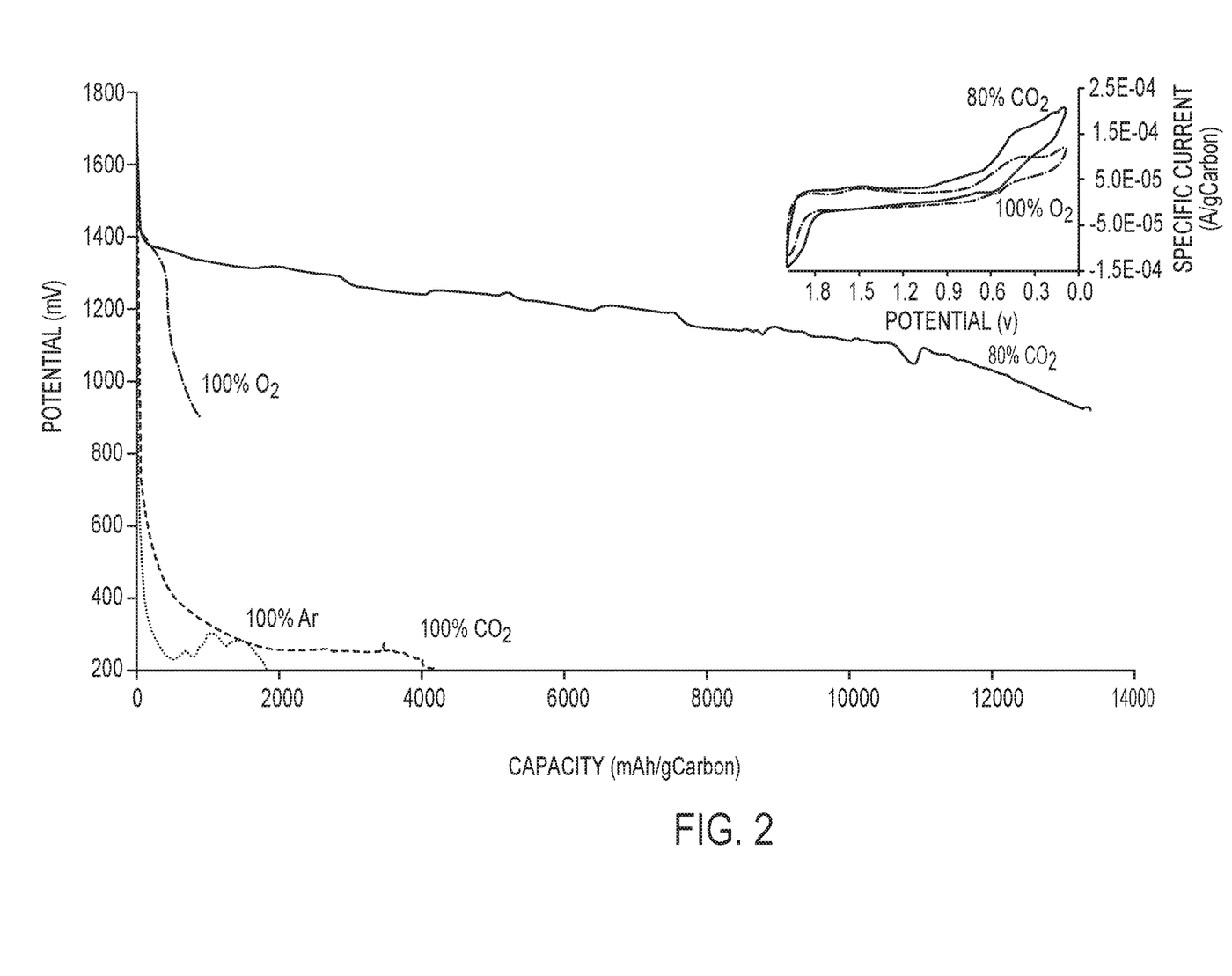
FIG. 2 is a plot of electrochemical performance of Al cell under different gas conditions. Galvanostatic discharge of Al under Ar, 100% $CO_2$, 100% $O_2$ and 80% $CO_2$ using [EMIm]Cl:$AlCl_3$ electrolyte of ratio 1:2 and current density of 70 mA/$g_{Carbon}$. Insert: Cyclic voltammetry for 3-electrode cell under 100% $O_2$ and 80% $CO_2$ with 0.1 mV/sec sweep rate.

Voltage profiles from galvanostatic discharge of Al electrochemical cells operated under Ar, $O_2$, $CO_2$, and mixtures of $CO/O_2$ are reported in FIG. 2. Discharging the Al cell under pure $O_2$ (denoted 100% $O_2$) produced considerable electrical energy (about 890 mA·hour/$g_{Carbon}$) at about 1.4 V. The capacity increased about 15-fold when $CO_2$ was introduced at a molar ratio of 80:20 compared to $O_2$ (denoted 80% $CO_2$). Discharging Al under pure $CO_2$ or Ar produced no/negligible electrical energy, with the only noticeable discharge voltage plateau at lower potential of about 0.3 V. Cyclic voltammetry (CV) (FIG. 2, inset) revealed a matching reduction peak around 1.5 V for Al/100% $O_2$ and Al/80% $CO_2$ systems, corresponding to the discharge potential. However, no corresponding oxidation peak was detected at the reduction peak of 1.5 V. The redox couple peaks at 0.45 to 0.55 V correspond to the lower discharge potential (0.3 V), which was noticed regardless of the gas environment, and probably arise from intercalation/deintercalation processes similar to those reported in the literature. In some embodiments, the molar ratio of $CO_2/O_2$ may be about 99:1, 90:10, 80:20, 70:30, 60:40, 50:50, 40:60, 30:70, 20:80, 10:90, 1:99, or 0:100, and encompassing any value therebetween.

Direct Analysis in Real-Time Mass Spectrometry

The main negative and positive ion mode fragments/ionized species detected in pristine cathodes and cathodes discharged under 100% $O_2$ and 80% $CO_2$ were identified. As expected, the strongest signals were produced by fragmentation/ionization of the ionic liquid and salt considering their abundance. Fragments of the salt complexed with moisture in the air and produced species $AlCl_3(OH)^-$, $AlCl_2(OH)_2^-$ and $AlCl(OH)_3^-$. Fragmentation of the [EMIm]Cl produced $C_6H_{11}N_2^+$, $C_5H_9N_2^+$, $C_4H_7N_2^+$ and $C_3H_4N_2^+$ indicating the loss of chlorine, methyl and ethyl groups. The $C_6H_{11}N_2Cl_2^-$ species were detected from the ionization of [EMIm]Cl with an additional chlorine. Those species were produced similarly from undischarged cathodes and cathodes discharged under 100% $O_2$ and 80% $CO_2$. The same fragments/species were reported of the [EMIm]Cl/$AlCl_3$ melt using other mass spec techniques, including Fast Atom Bombardment, Secondary Ion, Collision Induced Dissociation and Pyrolysis Gas Chromatography Mass Spec.

Remarkably, what sets cathodes discharged under 80% $CO_2$ apart is the detection of $Al_2(C_2O_4)_3$ fragments and ionized species with the electrolyte melt. Aluminum oxalate fragments to produce $Al(C_2O_4)^+$, $Al(C_2O_4)_2^-$, $Al(C_2O_4)(C_2O_3)^+$ and $Al(C_2O_4)O^-$. Aluminum oxalate also ionizes and complexes with $AlCl_3$ and [EMIm]Cl to produce $AlCl_2(C_2O_4)^-$, $C_6H_{11}N_2(C_2O_4)^-$, $(C_6H_{11}N_2)_3(C_2O_4)^+$ and $(C_6H_{11}N_2)_2(C_2O_4)Cl^-$. The intensity of the oxalate fragments were much lower than electrolyte species, where only the main peaks were detectable.

Scanning Electron Microscopy (SEM)—Energy Dispersive X-Ray Spectroscopy (EDXS)

Distinct differences were noted between cathodes discharged under 80% $CO_2$ and 100% $O_2$. Reaction products formed rugged micron-size particles on the stainless steel mesh cathodes discharged under 80% $CO_2$. Cathodes discharged under 100% $O_2$, on the other hand, showed submicron bead-like structures. The reaction products seemed to be distributed throughout the electrodes, though not completely covering them. It is not clear if the acetonitrile wash removed part of the reaction products form the electrodes.

Even after the acetonitrile wash, weak N and Cl signals are observed in the discharged and undischarged stainless steel cathodes by EDXS, most likely from remaining electrolyte. Whereas the Al atomic percentage in discharged cathodes was close to 10%, the undischarged cathode revealed values close to 1%. In the case of discharged cathodes, the atomic percentage of Al exceeded the stoichiometric values expected in the electrolyte when comparing to Cl atomic percentage, suggesting that Al is part of the reaction product depositing on the electrode. To discount the Al signal from the remaining electrolyte, the Al atomic percentage was adjusted based on the Cl signal and electrolyte stoichiometric value. Similarly, C was discounted based on the detected N and the corresponding electrolyte stoichiometry. The O to Al, C to Al and C to O atomic ratios are clearly larger for the cathodes discharged under 80% $CO_2$ and close to stoichiometric values of aluminum oxalate (6, 3 and 0.5, respectively). For the cathodes discharged under 100% $O_2$, the measured ratios are as expected consistent with stoichiometric values for aluminum oxide (1.5, 0 and 0, respectively). In contrast, for the undischarged cathodes, the ratios are close to the stoichiometric values for aluminum hydroxide (3, 0 and 0, respectively), suggesting that part of the remaining aluminum chloride reacts with moisture in the air during the short sample transfer. Both carbon and oxygen were detected in pristine stainless steel electrodes (not soaked in the electrolyte), which could explain the slightly higher ratios compared to aluminum in discharged cathodes.

X-Ray Photoelectron Spectroscopy

Wide survey scans were performed to estimate surface atomic ratios and high resolution scans were conducted for Al 2p, O 1s and C 1s to determine more precise chemical bonding information. Our findings are similar to those reported in the literature from XPS analysis of aluminum oxalate tetrahydrate, with the exception that binding energies are consistently around 2 eV higher than those observed in our study. We suspect that the difference in binding energies originates from differences in referencing of the spectra, which is particularly important for nonconductive materials. The literature indicated that XPS degrades aluminum oxalate to form aluminum oxides. We conducted XPS on chemically synthesized aluminum oxalate samples purchased from Sigma Aldrich to compare with the results from electrochemically created material. It is apparent that the C 1s spectra did not show the 288 eV peak, but rather displays a peak at 291 eV, which could be attributed to surface adsorbed $CO_2$ and CO (39). The C 1s 284 eV peak is attributed to remaining adventitious carbon since it is difficult to sputter powders.

The high resolution peak contributions were used in conjunction with atomic ratios from wide surveys to predict discharge compounds. The atomic ratios of oxygen to aluminum, carbon to aluminum and carbon to oxygen for specific bonds were provided. O 534 eV to Al 77 eV ratio can be used to evaluate presence aluminum oxalate since the peaks associated with those binding energies are linked to the Al—O—C bond. The ratios are clearly higher for the cathode discharged under 80% $CO_2$ compared to the cathode discharged under 100% $O_2$ or undischarged electrode. The ratio for the cathode discharged under 80% $CO_2$ is higher than the stoichiometric value of 3.0 and can be attributed to the presence of aluminum-oxygen complexes (notorious of this electrolyte melt in the presence of $O_2$ gas) which are linked to the same oxygen and aluminum peaks. Comparing the C 286 eV peak (associated with oxalate) to Al 77 eV and O 534 eV peaks demonstrate higher ratios of carbon for the cathode discharged under 80% $CO_2$ compared to 100% $O_2$ and undischarged electrode. The C 286 eV to Al 77 eV ratio higher than stoichiometric value of 3.0 in aluminum oxalate could be attributed to the presence of remaining ionic liquid on the surface since the same carbon peak is attributed to methyl and ethyl group in the ionic liquid. The C 286 eV to O 534 eV ratio is lower than stoichiometric value of 1.0 for oxalate and can be explained by the presence of oxides attributed to the same oxygen peak. Comparing the contribution of the same peaks for acquired aluminum oxalate, the O 534 eV to Al 77 eV and C 286 eV to Al 77 eV ratios are close to the stoichiometric values. The C 286 eV to O 534 eV ratio is slightly lower the stoichiometric value and could be explained by the presence of aluminum oxide.

Figure 3:
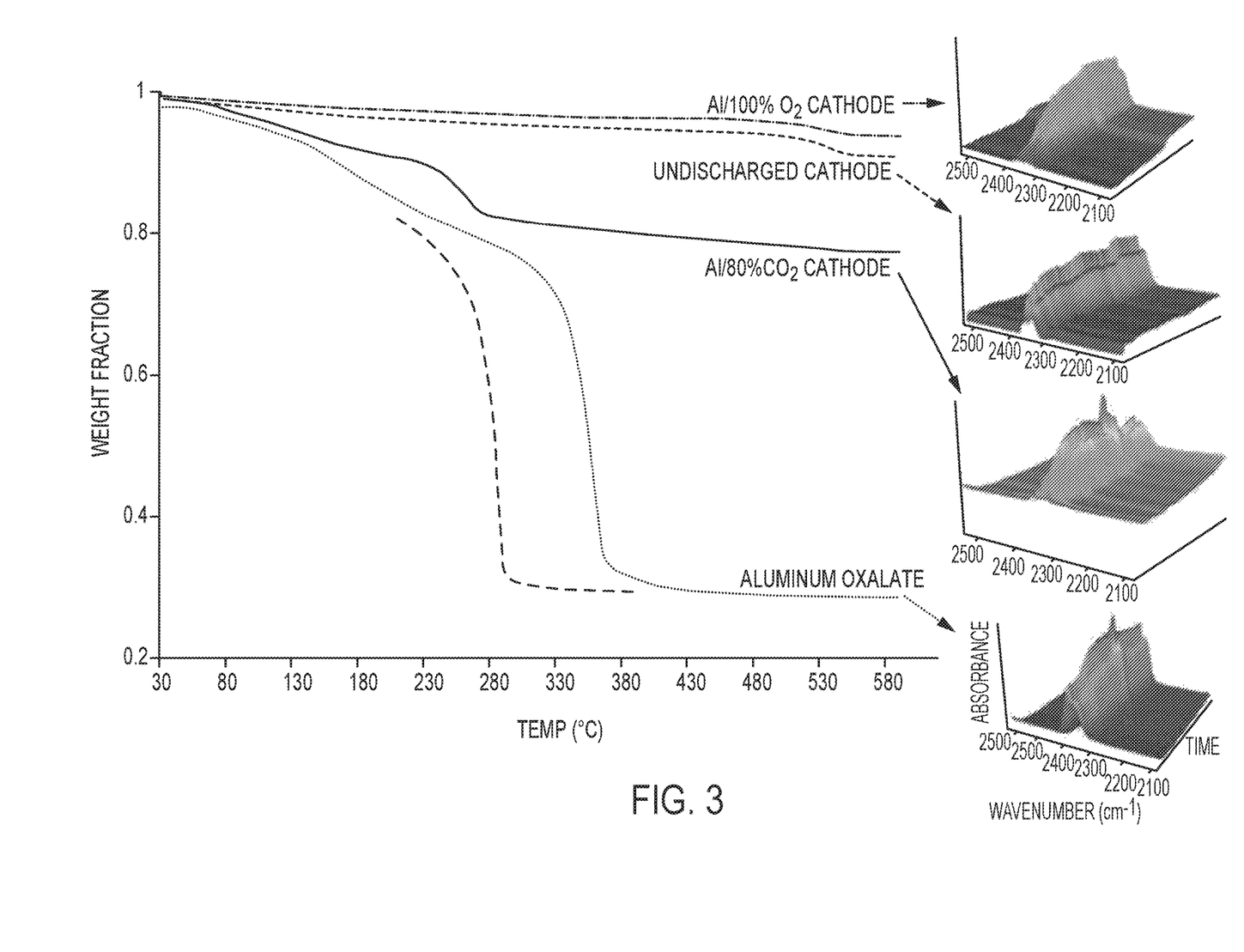
FIG. 3 is a plot of TGA coupled FTIR. TGA curves and coupled time-resolved FTIR spectra for discharged cathodes (under 80% $CO_2$ and 100% $O_2$), undischarged cathode and chemically synthesized aluminum oxalate. Ramp-up rates 5° C./min and 0.05° C./min for solid and dashed lines, respectively.

Thermogravimetric Analysis (TGA) Coupled Fourier Transform Infrared (FTIR) Spectroscopy Cathodes discharged under 80% $CO_2$, 100% $O_2$ and undischarged cathode exhibited similar TGA profiles, with a significant mass loss occurring around 530° C. (FIG. 3). This mass loss is attributed to the thermal decomposition of the ionic liquid. Only the cathode discharged under 80% $CO_2$ featured an additional defined dip at around 280° C. The TGA was coupled with FTIR to analyze the composition of the thermally degraded products as demonstrated in FIG. 3. All cathodes showed the evolution of $CO_2$ and $H_2O$ throughout the TGA experiment, from sample-adsorbed $CO_2$ and $H_2O$ during sample loading and degraded species. Focusing on the region of asymmetric stretch of $CO_2$ (2349 $cm^{-1}$), both the undischarged cathode and the cathode discharged under 100% $O_2$ clearly show $CO_2$ is evolved and that the evolution plateaus up to 600° C. The cathode discharged under 80% $CO_2$ also shows the evolution of $CO_2$ reaching a plateau and then a spike that is associated with the 280° C. TGA drop, which is hypothesized to result from degradation of discharge-deposited aluminum oxalate. The TGA-FTIR experiment was duplicated for the chemically synthesized aluminum oxalate to test this hypothesis. Significantly, the results show a similar thermal profile, including the spike, confirming that a significant release of $CO_2$. The TGA results, however, show the weight drop occurring around 350° C. The difference in the temperature could be attributed to the bigger size of chemically synthesized aluminum oxalate particles (>10 µm by SEM) compared to the deposited in Al/80% $CO_2$ electrochemical cell (~1 µm by SEM). Decreasing the TGA ramp-up rate provides a simple strategy for accommodating mass transfer differences between smaller and larger sample aggregate sizes. This expectation was confirmed by reducing the scan rate to 0.05° C./min whereupon the weight drop was seen to shift to 280° C. Literature reported the decomposition of aluminum oxalate tetrahydrate between 300 and 320° C. (10° C./min ramp-up rate). The acquired aluminum oxalate sample also showed the evolution of CO (2099 $cm^{-1}$) at very low intensity compared to $CO_2$.

Preliminary System Analysis

When recharging Al/80% $CO_2$ or Al/100% $O_2$ electrochemical cells using stainless steel cathodes, the recharge potential exhibits a shuttling-like behavior where it reaches a plateau and fluctuates radically. Similar behavior is well known for Li/S and Na/S batteries, where current is continuously consumed in a parasitic redox loop involving interconversion of metal polysulfide species of different orders dissolved in the electrolyte. In the case Al/80% $CO_2$ and Al/100% $O_2$, shuttling is tentatively attributed to a similar loop involving interconversion of different aluminum chloride species present in the electrolyte. These behaviors can be contrasted with what is seen when the cathode is replaced by Ketjenblack-casted carbons, where the Al electrochemical cell showed good recyclability achieving and maintaining about 200 $mAh/g_{Carbon}$ for more than 50 cycles. The cell recyclability, however, corresponds to an intercalation/deintercalation process and was seen under $CO_2$, $O_2$, $CO_2/O_2$ and Ar.

Based on these results, we conclude that a $CO_2$ capture/conversion system based on Al/80% $CO_2$ electrochemical cell may be most easily operated in a primary mode in which the Al anode is continuously fed to the cell and oxidized/consumed to form aluminum oxalate. Oxalic acid is used as a bleaching agent in the pharmaceutical and fiber industries, as a cleaning agent and as a precipitant in metal smelters. Demand for oxalic acid in these application has been increasing in recent years to support different sectors with an estimated worldwide demand of 230 000 tonnes in 1998. Oxalic acid can also be used as a feedstock to the production of dimethyl oxalate and eventually ethylene glycol, where the global production was estimated at 20 Million tonnes in 2010.

To evaluate the effectiveness of the proposed primary Al/80% $CO_2$ electrochemical cell as a $CO_2$ sequestration technology, Life Cycle Assessment (LCA) maybe used. LCA presents a structured approach to evaluate environmental impacts throughout a product's lifecycle (from raw material, production and waste management, etc.). It enables balancing $CO_2$ emissions associated with the Al anode production to abated $CO_2$ converted by the electrochemical cell from flue streams. In this paper we extend an LCA for aluminum metal production to act as a preliminary LCA for the Al/80% $CO_2$ electrochemical cell. Aspects related to efficiencies, electrolyte production/replacement, flue gas pretreatment and other features are yet to be incorporated. An LCA study that was conducted by The Aluminum Association, inline with ISO 1404/14044, estimated average genetic $CO_2$ emission values for North American aluminum industry based on input from 25 companies. The study accounted for $CO_2$ emissions from the four main process steps for Al metal production: bauxite mining, alumina refining, aluminum electrolysis and primary aluminum production. An average of 7.88 $kgCO_2/kgAl$ was estimated for the combined steps of aluminum production and associated processes.

Integrating the Al/80% $CO_2$ electrochemical cell in a flue gas stream, we estimate a total of 9.31 $kgCO_2/kg/Al$ to be captured and abated. We calculate 4.89 $kgCO_2/kgAl$ to be separated based on the proposed discharge reaction. Generated electric power from the battery replacing other energy sources results in overall reduction of $CO_2$ emissions. If the battery replaces natural gas sources, reduction of 1.97 $kgCO_2/kgAl$ can be credited to the system, based on a theoretical energy of 3.58 $kWh/kgAl$ and $CO_2$ emissions of 0.55 $kgCO_2/kWh$ associated with natural gas. We propose that the main discharge product of the battery can be converted to oxalic acid. Literature reported the relatively simple production of $H_2C_2O_4$ from $ZnC_2O_4$. We propose that $Al_2(C_2O_4)_3$ can be converted to $H_2C_2O_4$ and $Al_2O_3$, reducing $CO_2$ emissions associated with oxalic acid produced in industry through classical methods. One of the established methods to producing oxalic acid in industry is through the oxidation of propene with nitric acid, where $CO_2$ is produced in equimolar quantities to the oxalic acid. If Al/80% $CO_2$ electrochemical cell is used to produce $H_2C_2O_4$ instead of propene oxidation, $CO_2$ abatement can be estimated at 2.45 $kgCO_2$/kgAl. The overall balance of $CO_2$ shows that the primary Al/80% $CO_2$ electrochemical system reduces emissions from flue streams after accounting for emissions from Al metal production. If $Al_2O_3$ produced from $Al_2(C_2O_4)_3$ conversion to $H_2C_2O_4$ is recycled back to the Al production facility, aluminum can be produced, considerably reducing $CO_2$ emissions associated with the bauxite mining and alumina refining steps. This results in even higher $CO_2$ reduction (3.52 $kgCO_2$/kgAl) of the overall system. This outlines a preliminary LCA and a rigorous study is to be conducted to account for emissions associated with electrolyte replacement (depends on degradation rate), moisture removal from flue gases, oxalic acid production from aluminum oxalate and other aspects.

Discussion

The galvanostatic discharge at relatively high potential (1.4V) and CV experiments suggest that $O_2$ reduction is the main electrochemical process in the Al/$CO_2$—$O_2$ cell. Similar potential plateaus for Al discharged under pure $O_2$ or $CO_2/O_2$ mixture underlines that the main electrochemical process involves the reduction of $O_2$, expectedly forming superoxide species ($O_2^-$). Direct electrochemical reduction of $CO_2$ does not take place but rather through the chemical reduction by the superoxide species.

Similar results have been reported previously when incorporating $CO_2$ to Li/$O_2$ and Na/$O_2$ batteries, demonstrating an increase in discharge capacity while maintaining the same discharge potential. In ethylene carbonate/diethyl carbonate (EC/DEC) electrolyte, the incorporation of 50% $CO_2$ into Li/$O_2$ batteries increased the discharge capacity by three folds while maintaining the same discharge potential. The proposed discharge mechanism involves the reduction of $O_2$ to form the superoxide radical that in turn chemically reduces $CO_2$ to form $CO_4^{2-}$ and then $C_2O_6^{2-}$ radicals resulting in the formation of $Li_2CO_3$ as the main discharge product. In tetraethylene glycol dimethyl ether (tetraglyme), Li/$CO_2$—$O_2$ (2:1 ratio) was demonstrated to be rechargeable to limited number of cycles, forming $Li_2CO_3$ as the main discharge product. In Na/$O_2$ batteries, the introduction of $CO_2$ in ratios between 40 and 60% compared to $O_2$ increased the capacity by two to three folds depending on the electrolyte system. $Na_2CO_3$ and $Na_2C_2O_4$ were reported as the main discharge products in tetraglyme and ionic liquid electrolytes, respectively. Rechargeability was demonstrated when stabilizing the propylene carbonate electrolyte with ionic liquid-tethered silica nanoparticles where $NaHCO_3$ was the main discharge product.

Analytically, using DART-MS, SEM-EDXS, XPS and TGA-FTIR, it is shown that the principal discharge product of the Al/$CO_2$—$O_2$ cells is aluminum oxalate ($Al_2(C_2O_4)_3$). Accordingly, building on the hypothesized reaction mechanisms for Li/$CO_2$—$O_2$ and Na/$CO_2$—$O_2$ batteries, we propose the following reaction mechanism for the Al/$CO_2$—$O_2$ electrochemical cell:

$$2Al \leftrightarrow 2Al^{3+} + 6e^-$$

$$6O_2 + 6e^- \leftrightarrow 6O_2^-$$

$$3CO_2 + 3O_2^- \leftrightarrow 3CO_4^-$$

$$3CO_4^- + 3O_2^- \leftrightarrow 3CO_4^{2-} + 3O_2$$

$$3CO_4^{2-} + 3CO_2 \leftrightarrow 3C_2O_4^{2-} + 3O_2$$

$$2Al^{3+} + 3C_2O_4^{2-} \leftrightarrow Al_2(C_2O_4)_3$$

Overall Reaction: $2Al + 6CO_2 \leftrightarrow Al_2(C_2O_4)_3$

Protonic impurities could present a challenge when using [EMIm]Cl/$AlCl_3$ as an electrolyte because the electrochemically generated super oxide ($O_2^-$) could react with impurities in the electrolyte melt. A strong nucleophilic reagent such as $O_2^-$ is reported to react with and degrade the $EMI^+$ cation. Despite such possible side reactions, the introduction of $CO_2$ in higher ratios than $O_2$ demonstrated that $O_2^-$ reduces $CO_2$ to produce oxalates. It is believed that the $CO_2$ complexing with $AlCl_3$ in the electrolyte facilitates the chemical reduction of $CO_2$ by the superoxide and the eventual formation of oxalate.

The proposed $O_2$-assisted Al/$CO_2$ electrochemical cell demonstrates a new approach for converting $CO_2$ from a flue gas streams to useful products while producing considerable electrical energy. The preliminary LCA, which compares the captured/abated $CO_2$ by the proposed primary Al/$CO_2$—$O_2$ system to emissions associated with the production of the Al anode, showed a net reduction of $CO_2$ emissions.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Materials and Methods

Electrolyte Preparation and Material Handling

The electrolyte was prepared by slowly mixing 1-ethyl-3-methylimidazolium chloride ([EMIm]Cl) (Sigma Aldrich, >95%) with aluminum chloride ($AlCl_3$) (Sigma Aldrich, 99.99%). Acidic electrolyte melt (1:2 [EMIm]Cl:$AlCl_3$) was primarily used in this study. No major differences in electrochemical performance were noticed for electrolyte melts between ratios 1:2.1 and 1:1.5 ([EMIm]Cl:$AlCl_3$). The electrolyte was vacuum heated at 130° C. for 15 minutes to remove/reduce water and oxygen complexes before applying to the battery. Chemically synthesized aluminum oxalate hydrate (Alfa Aesar, 99%) was vacuum heated overnight at 120° C. to drive out hydrates. All materials used in the study were stored/prepared in an Ar-filled glovebox (MBraun. Labmaster). Electrochemical cells were also assembled in an Ar-filled glovebox. Electrode and electrolyte samples for postmortem analysis were obtained after disassembling cells inside the glovebox and transferring in Ar-filled vials for analysis outside the glovebox.

Electrochemical Cells Assembly

Al/$CO_2$—$O_2$ cells were assembled with CR2032 coin-type cells that were perforated on the cathode side (15.8 mm diameter). Ketjenblack (AkzoNobel EC600JD) was dissolved with Polyvinylidene floride (PVDF) binder (8:2 carbon to binder ratio) in N-methyl-2-pyrrolidone (NMP) solvent, ball milled and cast on carbon paper (Toray TGP-H-030). The cathodes were dried in vacuum oven overnight at 100° C. Typical loading of cathodes was 0.5-1.0 $mg_{carbon}$/$cm^2$. For comparison, other electrodes such as carbon paper, stainless steel mesh and nickel foam were tested with/without the porous carbon with comparable electrochemical performance. However, the use of porous carbon (providing considerably high surface area for the reduction reaction) was essential to reduce the overpotential in the system during discharge and obtain a high potential plateau. Al foil (Alfa Aesar, 99.99% 0.1 mm thick) were used as the anode after mechanical cleaning with silicon carbide sandpaper and washing with acetonitrile. Whatman GF/D glassfiber was used as separator and was soaked with 100 µL electrolyte. Custom-designed chambers were used to place battery cells, exposing them to premixed gases at 1 atm. Cuvette-type cells were used to conduct cyclic voltammetry and allow harnessing the electrolyte (1 mL) after discharge for postmortem analysis.

Electrochemical Experiments

Galvanostatic discharge experiments were conducted using a Neware CT-3008 battery testers at a fixed current density of 70 mA/$g_{Carbon}$. Cyclic Voltammetry (CV) was performed using Solartron Frequency Response Analyzer (model 1252) with a three-electrode configuration and a fixed 0.1 mV/sec scan rate. Ketjenblack on carbon paper was used as the working electrode. Tn wire (Alfa Aesar 99.99% 1.0 mm diameter) was used as the counter electrode. The reference electrode constituted an Al wire (Alfa Aesar, 99.999% 2.0 mm diameter) immersed in the same electrolyte. Counter and reference electrodes were mechanically cleaned with silicon carbide sandpaper and washed with acetonitrile.

Direct Analysis in Real Time (DART) Mass Spectrometry

High-resolution mass spectrometry (HRMS) analyses were carried out on a Thermo Scientific Exactive Orbitrap Mass Spec system equipped with an Ion Sense DART ion source. MestReNova software was used to analyze the mass spec results and compare them to predicted spectra. DART mass spectroscopy enables the analysis of products on discharged cathodes in their native states without the need for sample preparation. Exposing cathodes to the ion source fragments/ionizes the different species.

Scanning Electron Microscopy (SEM) and Energy Dispersive X-Ray Spectroscopy (EDXS)

SEM (Keck SEM) was conducted using Zeiss 1550 Field Emission (Schottky field emitter). EDXS was carried out with Bruker QUANTAX 200 and with XFlash®6 SDD and energy resolution of <126 eV at Mn—K-alpha line. For SEM-EDXS postmortem analysis, batteries were discharged using stainless steel mesh cathodes to be able to differentiate the reaction products from porous carbon electrodes. Discharged cathodes were washed with acetonitrile inside the Ar glovebox to remove excess electrolyte.

X-Ray Photoelectron Spectroscopy (XPS)

Samples were analyzed using a Surface Science Instruments SSX-100 with operating pressure ~$2 \times 10^{-9}$ Torr. Monochromatic Al K-alpha X-rays (1486.6 eV) were used with beam diameter of 1 mm. Photoelectrons were collected at a 55° emission angle. A hemispherical analyzer determined electron kinetic energy, using a pass energy of 150V for wide/survey scans, and 50V for high resolution scans. Samples were ion etched using 4 kV Ar ions, rastered over 2.25 mm×4 mm area with total ion beam current of 2 µA, to remove adventitious carbon. Spectra were referenced to adventitious C is at 284.5 eV. CasaXPS software was used for XPS data analysis with Shelby backgrounds. C is and O is were assigned single peaks for each bond. Al 2p were assigned double peak ($2p_{3/2}$ and $2p_{1/2}$) for each bond with 0.44 eV separation. Residual standard deviation was maintained close to 1.0 for the calculated fits. For XPS postmortem analysis, batteries were discharged using stainless steel mesh cathodes to be able to differentiate reaction products from carbon electrodes. Discharged cathodes were washed with acetonitrile inside the Ar glovebox to remove excess electrolyte.

Thermogravimetric Analysis (TGA) coupled Fourier Transform Infrared (FTIR) Spectroscopy TGA was carried out using TA Instruments TGA Q500 up to 600° C. at 5° C./min unless otherwise stated. The FTIR spectrum was obtained by Thermo Scientific Nicolet iZ10 spectrometer with TGA sampling accessory. Evolved gases were flushed through the TGA-FTIR chambers with $N_2$ (10 mL/min with VWR peristaltic pump terminating at a liquid seal). OMNIC software was used to construct 3D (absorbance and wavenumber vs. time) plots of FTIR spectra. TGA-FTIR was conducted on Ketjenblack-based cathodes that were washed with acetonitrile to remove excess electrolyte.

Base Case Tests

Considering the sensitivity of the electrolyte system and to account for any interaction with air, moisture and impurities, the DART-MS, SEM-EDXS, XPS and TGA-FTIR experiments of discharged cathodes were compared with undischarged cathodes (base case). The undischarged cathodes were assembled in exactly same way as the discharged cathodes and were soaked in the electrolyte system and exposed to a mixture of $CO_2$ and $O_2$ before washing with acetonitrile.

Electrolyte Preparation and Material Handling

The electrolyte was prepared by slowly mixing 1-ethyl-3-methylimidazolium chloride (EMImCl) (Sigma Aldrich, >95%) with aluminum chloride ($AlCl_3$) (Sigma Aldrich, 99.99%) in an Ar-filled glovebox. The electrolyte was vacuum heated at 130° C. for 15 minutes to remove/reduce water and oxygen complexes before applying to the battery. N-decane (≥99%), 1-decene (94%), $KO_2$ (chunks), Dicyclohexano-18-Crown-6 (98%) were acquired from Sigma Aldrich and the deuterated solvents $D_2O$ (D, 99.9%), $CDCl_3$ (D, 99.8%) and $C_3D_6O$ (D, 99.9.%) were acquired from Cambridge Isotope Laboratories, Inc.

Electrochemical Cells Assembly and Post-Mortem Analysis

Cathodes were prepared by dissolving Ketjenblack (AkzoNobel EC600JD) with polyvinylidene fluoride (PVDF) binder (8:2 carbon to binder ratio) in n-methyl-2-pyrrolidone (NMP) solvent, ball milling and casting on carbon paper (Toray TGP-H-030). The cathodes were dried in vacuum oven overnight at 100° C. Typical loading of cathodes was 0.5-1.0 $mg_{Carbon}/cm^2$. Al foil (Alfa Aesar, 99.99% 0.1 mm thick) was used as the anode after mechanical cleaning with silicon carbide sandpaper and washing with acetone. The Al foil was dipped and scratched while in contact with the electrolyte before applying to the electrochemical cells. PMMA cuvettes (BRAND, 12.5 mm×12.5 mm×45 mm) were used as electrochemical cells. The electrodes were prepared as 1 mm strips and inserted in the cuvettes with Whatman filter paper as separator. 1 mL electrolyte and equivalent hydrocarbon was supplied to the electrochemical cells. Custom-designed chambers were used to place the electrochemical cuvettes, exposing them to premixed gases at 1 atm.

An Ar-filled glovebox was used to store the electrodes, assemble the electrochemical cells, disassemble the cells for postmortem analysis and store samples. The neat electrolyte was used to conduct $^{27}$Al-NMR. To separate the product hydrocarbons, 300 µL of the hydrocarbon or electrolyte was dissolved in 5 mL $CDCl_3$/5 mL $D_2O$, mixed and centrifuged for 15 min. The $CDCl_3$ layer was used to conduct DART-MS. 300 µL of the $CDCl_3$ layer was dissolved in 1 mL $C_3D_6O$ to use for $^1$H-NMR and GC-MS.

Electrochemical Experiments

Galvanostatic discharge experiments were conducted using the Neware CT-3008 battery testers at a fixed current density of 20 mA/$g_{Carbon}$. The cutoff potential was selected relative to the main discharge potential to avoid other side reactions/phenomena, such as the aluminum chloride anions intercalating into porous carbon (32).

Gas Chromatography-Mass Spectrometry (GC-MS)

GC-MS was conducted using Agilent Technologies (Santa Clara, Calif.) 6890N gas chromatograph equipped with an Agilent 7683B autosampler and coupled to a JEOL (Peabody, Mass.) GCMate II double-focusing sector mass spectrometer. The injection volume was 1 μL. The split/splitless inlet was operated in split flow mode with 10:1 split ratio. Inlet temperature was maintained at 60° C. The oven program used was as follows: 60° C. for 3 minutes; ramp to 120° C. at 5° C./min; ramp to 270° C. at 25° C./min; and a finally hold for 4 minutes for a total run time of 25 minutes. The GC column used was a DB-5 MS+DG capillary column (Agilent Technologies) with the dimensions 30 m×0.25 mm ID, 0.25 μm film thickness and a 10 m DuraGuard guard column section. The MS was operated in positive ion mode at nominal resolving power of 500 (actual 670). Electron impact ionization was used with 70 eV potential and 200 mA filament current. Mass spectra were acquired from 35 to 500 m/z using a magnetic field sweep with 0.22 s/scan and 0.1 second interscan delay to give 0.32 second total scan duration. Data analysis was performed using TSSPro 3.0 (Shrader Analytical and Consulting Laboratories Inc., Detroit, Mich.).

Residual Gas Analysis-Mass Spectrometry (RGA-MS)

RGA-MS was conducted using Extorr-XT200 amu quadrupole residual gas analyzer (Extorr Inc., New Kensington, Pa.), measuring total gas and partial gases pressure up to 200 amu. The RGA is equipped with a Pfeiffer turbo pump (Pfeiffer Vacuum Inc, Nashua, N.H.) to allow for sampling the gas of electrochemical chamber. The system was calibrated to the atmosphere before each run.

Direct Analysis in Real Time-High Resolution Mass Spectrometry (DART-MS)

DART high-resolution mass spectrometry analyses were carried out on a Thermo Scientific Exactive Orbitrap Mass Spec system operating at 100,000 resolution in positive mode. DART ion sources (IonSense, Saugus, Mass.) was operated with He gas at 350° C. MestReNova software (Mestrelab Research) was used to analyze the mass spec results and compare them to predicted spectra.

Nuclear Magnetic Resonance Spectroscopy ($^1$H and $^{27}$Al NMR)

NMR was conducted using 500 MHz Bruker AVIII HD spectrometer equipped with a broadband Prodigy Cryoprobe and SampleXpress autosampler. Samples were prepared in acetone-$d_6$ and $^1$H were referenced to residual acetone-$d_5$ at 2.07 ppm. $^{27}$Al spectra were run neat without locking or shimming and were referenced to external aqueous $AlCl_3$ at 0 ppm. Spectra were acquired with probe-background suppression using the zgbs sequence provided in Bruker TopSpin 3.5.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A process to upgrade a feedstock, the process comprising:
supplying a feedstock to a metal/oxygen electrochemical cell while operating the cell to generate current and to upgrade the feedstock, wherein operating the cell to upgrade the feedstock comprises: i) isomerizing the feedstock, ii) oligomerizing hydrocarbons, or iii) carboxylating hydrocarbons; and
recovering the upgraded feedstock.

2. The process of claim 1, wherein the metal/oxygen electrochemical cell comprises a positive electrode, a negative electrode and an electrolyte in which the cell is configured to produce superoxide.

3. The process of claim 1, wherein the feedstock comprises carbon dioxide, liquid hydrocarbons, natural gas, heavy/low-value hydrocarbon distillates, sulfur, hydrogen sulfide or a combination thereof.

4. The process of claim 1, wherein an alkane is supplied to the cell and longer chain alkanes are produced and recovered.

5. The process of claim 1, wherein operating the cell to upgrade the feedstock comprises isomerizing the feedstock.

6. The process of claim 1, wherein operating the cell to upgrade the feedstock comprises oligomerizing hydrocarbons.

7. The process of claim 1, wherein operating the cell to upgrade the feedstock comprises carboxylating hydrocarbons.

8. The process of claim 1, wherein the negative electrode comprises aluminum metal.

9. The process of claim 1, wherein the electrolyte comprises an ionic liquid and a metal salt.

10. The process of claim 1, wherein the feedstock comprises (i) hydrocarbons, or (ii) carbon dioxide and hydrocarbons.

11. The process of claim 1, wherein hydrogen or hydrogen sulfide is added to the metal/oxygen electrochemical cell to react with the feedstock.

12. A process to upgrade a feedstock, the process comprising:
supplying a feedstock to a metal/oxygen electrochemical cell while operating the cell to generate current and to upgrade the feedstock, wherein an alkane is supplied to the cell and longer chain alkanes are produced and recovered; and
recovering the upgraded feedstock.

13. The process of claim 12, wherein the metal/oxygen electrochemical cell comprises a positive electrode, a negative electrode and an electrolyte in which the cell is configured to produce superoxide.

14. The process of claim 12, wherein the feedstock comprises carbon dioxide, liquid hydrocarbons, natural gas, heavy/low-value hydrocarbon distillates, sulfur, hydrogen sulfide or a combination thereof.

15. The process of claim 12, wherein operating the cell to upgrade the feedstock comprises i) isomerizing the feedstock, ii) oligomerizing hydrocarbons, or iii) carboxylating hydrocarbons.

16. The process of claim 12, wherein the negative electrode comprises aluminum metal.

17. The process of claim 12, wherein the electrolyte comprises an ionic liquid and a metal salt.

18. The process of claim 12, wherein the feedstock comprises (i) hydrocarbons, or (ii) carbon dioxide and hydrocarbons.

19. The process of claim 12, wherein hydrogen or hydrogen sulfide is added to the metal/oxygen electrochemical cell to react with the feedstock.

20. A process to upgrade a feedstock, the process comprising:
supplying a feedstock to a metal/oxygen electrochemical cell while operating the cell to generate current and to upgrade the feedstock, wherein the feedstock comprises (i) hydrocarbons, or (ii) carbon dioxide and hydrocarbons; and
recovering the upgraded feedstock.

21. The process of claim 20, wherein the metal/oxygen electrochemical cell comprises a positive electrode, a negative electrode and an electrolyte in which the cell is configured to produce superoxide.

22. The process of claim 20, wherein the feedstock comprises carbon dioxide, liquid hydrocarbons, natural gas, heavy/low-value hydrocarbon distillates, sulfur, hydrogen sulfide or a combination thereof.

23. The process of claim 20, wherein an alkane is supplied to the cell and longer chain alkanes are produced and recovered.

24. The process of claim 20, wherein operating the cell to upgrade the feedstock comprises i) isomerizing the feedstock, ii) oligomerizing hydrocarbons, or iii) carboxylating hydrocarbons.

25. The process of claim 20, wherein the negative electrode comprises aluminum metal.

26. The process of claim 20, wherein the electrolyte comprises an ionic liquid and a metal salt.

27. The process of claim 20, wherein hydrogen or hydrogen sulfide is added to the metal/oxygen electrochemical cell to react with the feedstock.

28. A process to upgrade a feedstock, the process comprising:
supplying a feedstock to a metal/oxygen electrochemical cell while operating the cell to generate current and to upgrade the feedstock, wherein hydrogen or hydrogen sulfide is added to the metal/oxygen electrochemical cell to react with the feedstock; and
recovering the upgraded feedstock.

29. The process of claim 28, wherein the metal/oxygen electrochemical cell comprises a positive electrode, a negative electrode and an electrolyte in which the cell is configured to produce superoxide.

30. The process of claim 28, wherein the feedstock comprises carbon dioxide, liquid hydrocarbons, natural gas, heavy/low-value hydrocarbon distillates, sulfur, hydrogen sulfide or a combination thereof.

31. The process of claim 28, wherein an alkane is supplied to the cell and longer chain alkanes are produced and recovered.

32. The process of claim 28, wherein operating the cell to upgrade the feedstock comprises i) isomerizing the feedstock, ii) oligomerizing hydrocarbons, or iii) carboxylating hydrocarbons.

33. The process of claim 28, wherein the negative electrode comprises aluminum metal.

34. The process of claim 28, wherein the electrolyte comprises an ionic liquid and a metal salt.

35. The process of claim 28, wherein the feedstock comprises (i) hydrocarbons, or (ii) carbon dioxide and hydrocarbons.

* * * * *